United States Patent
Gammill

(10) Patent No.: US 7,125,038 B2
(45) Date of Patent: Oct. 24, 2006

(54) TWIST PREVENTION APPARATUS AND METHOD FOR AN INFLATABLE AIRBAG CURTAIN

(75) Inventor: Kurt Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 344 days.

(21) Appl. No.: 10/694,322

(22) Filed: Oct. 27, 2003

(65) Prior Publication Data
US 2005/0087960 A1    Apr. 28, 2005

(51) Int. Cl.
*B60R 21/213* (2006.01)
(52) U.S. Cl. .................... 280/728.2; 280/730.2
(58) Field of Classification Search ............ 280/743.2, 280/730.2, 749, 728.2
See application file for complete search history.

(56) References Cited

U.S. PATENT DOCUMENTS

| | | | |
|---|---|---|---|
| 5,162,035 A | 11/1992 | Baker | |
| 5,240,282 A | 8/1993 | Wehner et al. | |
| 5,531,477 A | 7/1996 | Madrigal et al. | |
| 5,533,750 A * | 7/1996 | Karlow et al. | 280/730.2 |
| 5,611,563 A * | 3/1997 | Olson et al. | 280/728.2 |
| 5,687,988 A * | 11/1997 | Storey et al. | 280/728.2 |
| 5,746,690 A | 5/1998 | Humbarger et al. | |
| 5,775,733 A | 7/1998 | Lunt et al. | |
| 5,799,970 A * | 9/1998 | Enders | 280/730.2 |
| 5,810,390 A * | 9/1998 | Enders et al. | 280/730.2 |
| 5,845,935 A * | 12/1998 | Enders et al. | 280/743.2 |
| 5,865,465 A | 2/1999 | Bauer et al. | |
| 5,921,575 A | 7/1999 | Kretschmer et al. | |
| 5,944,346 A | 8/1999 | Lachat et al. | |
| 6,000,715 A | 12/1999 | Tschaeschke | |
| 6,073,961 A | 6/2000 | Bailey et al. | |
| 6,079,732 A | 6/2000 | Nakajima et al. | |
| 6,102,435 A | 8/2000 | Wallner et al. | |
| 6,110,094 A | 8/2000 | Wallentin et al. | |
| 6,126,192 A * | 10/2000 | Enders | 280/728.2 |
| 6,152,481 A | 11/2000 | Webber et al. | |
| 6,179,323 B1 | 1/2001 | Shellabarger et al. | |
| 6,231,070 B1 | 5/2001 | Sunabashiri et al. | |
| 6,237,943 B1 | 5/2001 | Brown et al. | |
| 6,257,616 B1 | 7/2001 | Nowak et al. | |
| 6,264,234 B1 | 7/2001 | Hill et al. | |
| 6,293,581 B1 | 9/2001 | Saita et al. | |
| 6,305,707 B1 | 10/2001 | Ishiyama et al. | |
| 6,336,651 B1 | 1/2002 | Mramor et al. | |

(Continued)

FOREIGN PATENT DOCUMENTS

DE    196 43 796    12/1996

*Primary Examiner*—Paul N. Dickson
*Assistant Examiner*—Barry Gooden, Jr.
(74) *Attorney, Agent, or Firm*—Sally J Brown

(57) ABSTRACT

An inflatable airbag curtain assembly that includes an inflatable curtain and a stiffening member is provided. The stiffening member is a bar-shaped plastic, metal, or similar component with a stiffness greater than the inflatable curtain. The stiffening member extends along a length of the inflatable curtain adjacent the inlet port and the closest mounting location to the roof rail of the vehicle. The stiffening member can be disposed within a channel formed near the top edge of the curtain. The inlet port of the inflatable curtain can receive a gas guide that extends from an inflator. The stiffening member has an attaching portion that connects to a defined location on the gas guide. The stiffening member thereby resists twisting of the inflatable curtain between the gas guide junction and the closest mounting location.

22 Claims, 3 Drawing Sheets

U.S. PATENT DOCUMENTS

| | | | |
|---|---|---|---|
| 6,375,214 B1 * | 4/2002 | Nishikaji | 280/728.2 |
| 6,412,810 B1 | 7/2002 | Wipasuramonton et al. | |
| 6,425,601 B1 | 7/2002 | Lewis | |
| 6,447,005 B1 | 9/2002 | Alb et al. | |
| 6,450,529 B1 * | 9/2002 | Kalandek et al. | 280/730.2 |
| 6,454,297 B1 * | 9/2002 | Fischer | 280/730.2 |
| 6,454,298 B1 | 9/2002 | Hardig et al. | |
| 6,749,216 B1 * | 6/2004 | Tanase et al. | 280/730.2 |
| 6,758,490 B1 * | 7/2004 | Hoeft et al. | 280/730.2 |
| 6,783,148 B1 * | 8/2004 | Henderson | 280/728.2 |
| 6,902,187 B1 * | 6/2005 | Sonnenberg | 280/730.2 |
| 2002/0105174 A1 * | 8/2002 | Tanase et al. | 280/730.2 |
| 2002/0125692 A1 * | 9/2002 | Brannon et al. | 280/730.2 |
| 2002/0158450 A1 * | 10/2002 | Hoeft et al. | 280/730.2 |
| 2003/0080541 A1 * | 5/2003 | Kalandek et al. | 280/730.2 |
| 2003/0094797 A1 * | 5/2003 | Sonnenberg | 280/730.2 |
| 2003/0132615 A1 | 7/2003 | Henderson | |
| 2003/0132624 A1 | 7/2003 | Hall et al. | |

* cited by examiner ined herein by way of example only and may not be construed as limiting the scope of the present invention in any way. Additionally, all references cited herein are incorporated herein by reference in their entirety for all purposes.

TWIST PREVENTION APPARATUS AND METHOD FOR AN INFLATABLE AIRBAG CURTAIN

BACKGROUND OF THE INVENTION

1. Field of the Invention

The present invention relates to an inflatable airbag curtain assembly that prevents twisting of the inflatable curtain during production, installation, or service of the curtain. More particularly, the present invention relates to an inflatable airbag curtain assembly that includes a stiffening member extending from the gas guide to the nearest mounting location to prevent twisting of the inflatable curtain.

2. Description of Related Art

Inflatable safety restraint devices, or airbags, are well accepted for use in motor vehicles and have been credited with preventing numerous deaths and injuries. Inflatable airbags are now mandatory on most new vehicles. Airbags are typically installed as part of a system with an airbag module in the steering wheel on the driver's side of a car and in the dashboard on the passenger side of a car. In the event of an accident, a sensor within the vehicle measures abnormal deceleration and triggers the ignition of an explosive charge contained within an inflator. Expanding gases from the charge travel through conduits and fill the airbags, which immediately inflate in front of the driver and passenger to protect them from harmful impact with the interior of the car.

Side impact airbag systems have also been developed in response to the need for similar protection from lateral impacts between a passenger and the side of a vehicle's interior. This might occur when another vehicle collides with the side of the car, or in a rollover situation where the side of the car is repeatedly impacting the ground. These airbags, which are commonly referred to as "inflatable cushions" or "inflatable curtains," may be mounted on or near the roof rail, or the portion of the frame that extends along a length of the vehicle between the side windows and the roof.

Recently, airbag technology has continued to advance such that inflatable airbags curtains are now enlisted to provide roll-over protection as well as side impact protection. During a roll-over accident, the vehicle occupants can be jostled considerably, thereby causing the occupant to impact various parts of the vehicle interior. Even worse, the occupant may be ejected from the vehicle. Alternatively, a head or limb of an occupant may extend outside the vehicle during the roll-over. Such "occupant excursion" during roll-over accidents is a common cause of automotive fatality, particularly in the case of vehicle occupants that are not wearing a seat belt during the roll-over.

Conventional curtain airbags attempt to combat the dangers of side impact or roll-over accidents by providing impact protection and occupant retention. The inflatable curtain is typically compacted, i.e., folded, rolled, or processed through a combination of folding and rolling, to stow the cushion behind a headliner covering the interior of the roof of the vehicle. The curtain may be designed to unroll or unfold downward from the roof of the vehicle and then inflate beside the person as a means of preventing the person from hitting the door, window, or lateral side of the vehicle. Since a vehicle occupant may be leaning forward, reclined in the seat, or at any position in between, such curtain airbags are usually designed to be long enough to cover the whole interior side of the vehicle, protecting occupants in both front and rear passenger compartments.

Generally, the inflatable curtain airbag must be sized to hold large volumes of inflation gas and to descend below the window sill. Consequently, when not inflated the airbag curtain includes a significant amount of material. This material is then rolled, folded, or otherwise gathered to form a tight, tubular bundle. A wrapper (sometimes called a "sock") that fits around the curtain is then added to ensure that the airbag curtain is kept rolled or folded.

The stored curtain is then mounted either on or proximate a roof rail of the vehicle. Such mounting is generally accomplished via a two-step process. First, the curtain must be held in the proper position. This can be done by either having multiple workers hold the airbag or by attaching the airbag to sophisticated jigs, hooks, clips, or mounting brackets (collectively "brackets") that have been placed into slots in the body of the vehicle. Once the airbag curtain has been secured in the proper location, the workers are free to affix the airbag curtain assembly to the vehicle using fasteners such as bolts, screws, rivets, and the like. Usually these fasteners are threaded into one or more attachment tabs that have been added along the top of the airbag curtain to facilitate the assembly and mounting process. A metal gas guide that extends from the inflator is then connected to an inlet port of the inflatable curtain.

Although inflatable airbag curtain systems have significantly increased the overall safety of the vehicle, problems and challenges still exist that limit the ability of airbag and vehicle manufacturers to implement and use inflatable curtains on all types of vehicles. One such problem relates to the fact that once the curtain has been rolled or folded into a tubular-shaped bundle, portions of the curtain tend to twist, kink, or become otherwise entangled. Twisting is particularly troublesome between the textile cushion/metal gas guide junction and the nearest mounting location to the roof rail. The twisting of the inflatable curtain at this critical junction is detrimental because if a vehicle manufacturer installs the curtain in this twisted shape or the curtain is twisted during service, there is an increased likelihood that the curtain will fail, rip, deploy improperly, and/or otherwise malfunction during an accident. Vehicle occupants are endangered thereby.

In an attempt to reduce the likelihood that the inflatable curtain will be installed with a twisted shape, some recent inflatable curtains have been made with alignment lines or other similar markings that give a visual indication to the airbag installer or servicer if the curtain has been assembled having a twist or other entanglement. Unfortunately however, many vehicle manufacturers do not favor the use of these alignment lines because they believe that a visual inspection of the alignment lines does not provide a reliable and repeatable mechanism for determining whether the installed curtain contains a twist.

Moreover, vehicle manufacturers further do not favor the use of alignment lines because the alignment lines can significantly increase the total costs associated with producing, assembling, and installing the inflatable airbag curtain system. For example, requiring airbag installers or servicers to visually inspect the alignment lines after the curtain has been installed into the vehicles means that the overall time needed to install the curtain must be increased. As manufacturers incur costs for every moment that passes during the assembly process, even an increase of a few seconds or minutes in the assembly time represents a significant impact on the manufacturer's total production costs and overall profit margin of a mass-produced vehicle.

Accordingly, a need exists for an inflatable airbag curtain assembly that is difficult to twist, particularly during production, installation, or service of the inflatable curtain. It is particularly desirable that twisting of the curtain be prevented adjacent the junction of the textile inlet port of the curtain and the gas guide to the inflator. It is also desirable to prevent twisting of the curtain along its longitudinal length. It is further desirable that an inflatable curtain assembly be installable without relying solely on the efforts of the installers to align the curtain properly without kinks, crimps or twists. It is also desirable for an inflatable curtain assembly to be installable in a way that proper orientation of the gas guide and the inflatable curtain is achieved. Such a device is disclosed herein.

SUMMARY OF THE INVENTION

The apparatus of the present invention has been developed in response to the present state of the art, and in particular, in response to the problems and needs in the art that have not yet been fully solved by currently available inflatable airbag curtain assemblies. Thus, the present invention provides an inflatable curtain assembly that prevents twisting of the inflatable curtain near its junction with the inflator assembly. The inflatable curtain assembly could also be configured to prevent twisting of the curtain along its entire longitudinal length. Furthermore, the inflatable curtain assembly of the present invention facilitates proper orientation of the inflatable curtain to the inflator assembly.

In accordance with the invention as embodied and broadly described herein in the preferred embodiment, an inflatable airbag curtain assembly is provided. According to one configuration, the inflatable curtain assembly includes an inflatable curtain having an inlet port that can receive a gas guide which extends from an inflator. The inflatable curtain also has one or more mounting locations for attaching the inflatable curtain on or proximate the roof rail of the vehicle. The mounting locations can be attachment tabs that have an orifice through which a fastener can be disposed when mounting to the vehicle. Furthermore, mounting clips, brackets, clamps or the like can be used to attach to the top edge of the curtain or to the attachment tabs, rigidly mounting the curtain to the vehicle.

A stiffening member is connected to the gas guide and extends adjacent the top edge of the inflatable curtain overlapping the mounting location nearest the junction of the gas guide and inlet port. The stiffening member is preferably disposed within a channel that is formed in the inflatable curtain. The channel can be integral with the parent material of the inflatable curtain or it can be a separate structure that is attached to the curtain by sewing, bonding, welding and the like. The channel extends adjacent the inlet port of the inflatable curtain to at least the nearest mounting location. However, the channel could extend the entire longitudinal length of the curtain along its top edge to allow the stiffening member to extend to any portion of the length of the curtain. Several stiffening members can also be used in the inflatable airbag curtain assembly to prevent twisting of the curtain along its body.

The stiffening member can be a bar, rod, plate or similar structure that can prevent twisting, kinking, or crimping of the inflatable curtain during production, installation, or service of the airbag assembly. The stiffening member can be constructed of metal, plastic, or any substance that has a stiffness greater than the inflatable curtain (which is typically constructed of a tightly woven textile material). The stiffening member is preferably disposed within the channel, but could also be affixed to the curtain by sewing, bonding, welding, and the like.

The stiffening member must be able to extend from the gas guide to at least the closest mounting location to prevent twisting of the curtain at the critical area between the junction of the gas guide and the inlet port and the closest mounting location. However, the stiffening member could overlap several or all of the other mounting locations to prevent twisting of the curtain along its longitudinal length. The stiffening member could have an attachment portion at one end that attaches to a defined location on the gas guide. The attachment portion could be a ring, hook, orifice or female member that receives a protrusion, such as a hook, nodule or male member on the gas guide to facilitate proper orientation of the inflatable curtain to the gas guide and prevent twisting of the curtain adjacent the gas guide junction.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4b, is not intended to limit the scope of the invention, as claimed, but is merely representative of presently preferred embodiments of the invention.

Figure 1:
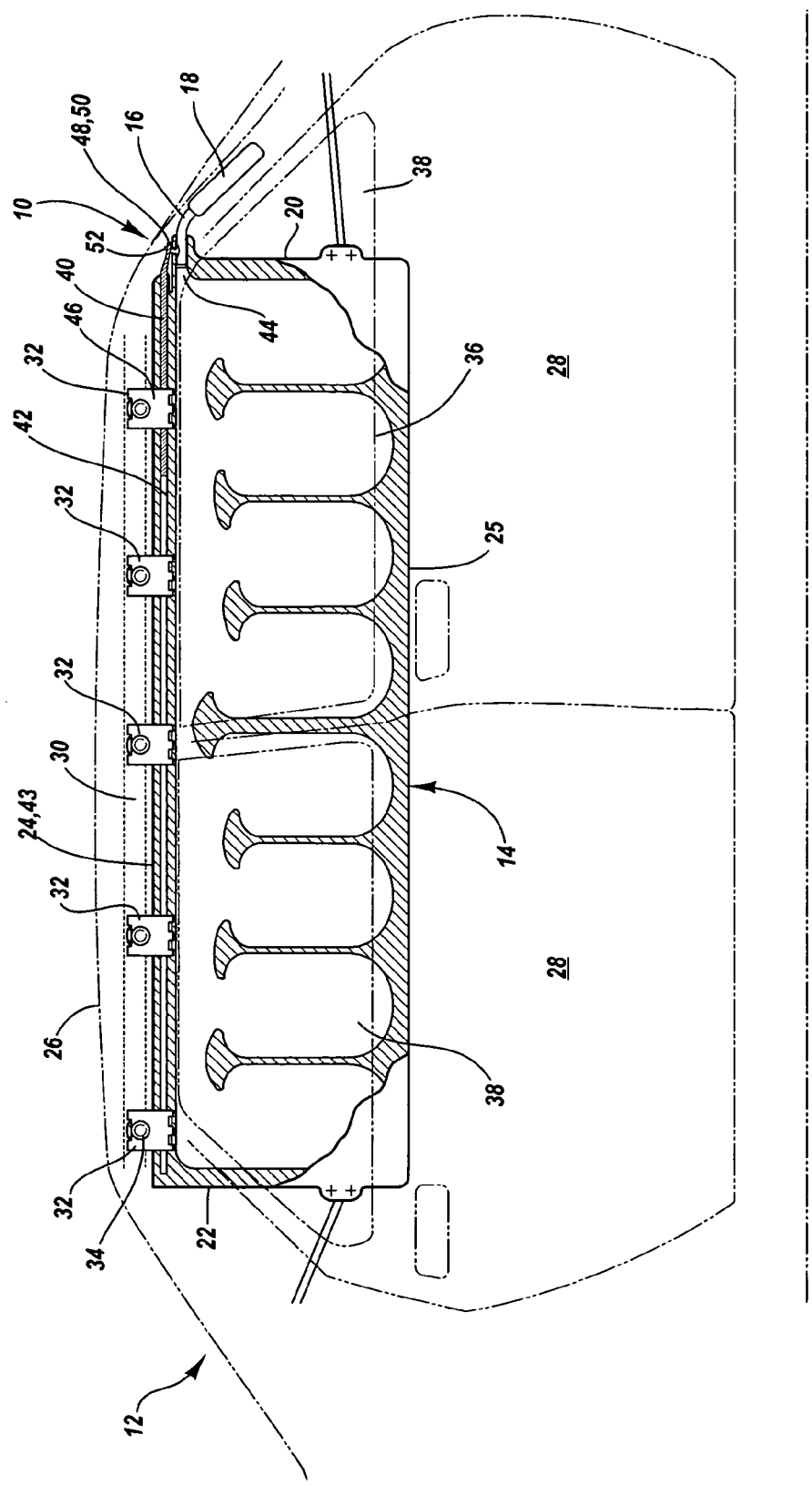
FIG. 1 is a cross-sectional, side elevation view of one embodiment of the inflatable curtain assembly mounted inside a motor vehicle.

Referring to FIG. 1, an inflatable curtain assembly 10 is depicted in a cross-sectional, side elevation view mounted inside a motor vehicle 12. The inflatable curtain assembly 10 includes an inflatable side airbag curtain 14 attached to a gas guide 16 that interconnects the inflatable curtain 14 and an inflator 18. The inflator 18 is shown disposed proximate the rear edge 20 of the inflatable curtain 14. However, the inflator could be disposed at various locations adjacent the inflatable curtain 14, such as near the front edge 22 or proximate the top edge 24 within the envelope between the roof 26 of the vehicle 12 and the headliner. The inflator 18 is a device for rapidly inflating the curtain 14 in a lateral collision or rollover situation. The inflator 18 could be a pyrotechnic that uses the combustion of gas-generating material to generate inflation fluid. Alternatively, the inflator 18 could contain a stored quantity of pressurized inflation fluid or a combination of pressurized inflation fluid and ignitable material for heating the inflation fluid.

The inflatable curtain 14 is usually positioned above the side door 28 of the vehicle 12 proximate or on the roof rail 30. As shown in FIG. 1, the top edge 24 of the inflatable curtain 14 extends substantially the same length of the roof rail 30. However, other embodiments of the inflatable curtain 14 may be made in which the top edge 24 is either larger or smaller than the length of the roof rail 30. In order for the inflatable curtain 14 to maintain its position proximate or on the roof rail 30 during normal operation or during a collision, the curtain 14 is secured to the vehicle 12 through the use of mounting clips 32. Other devices may be used such as mounting brackets, braces, clamps, and the like. Furthermore, no separate device may be required if the inflatable curtain 14 includes integral attachment tabs protruding from the top edge 24 for receiving a fastener. Alternatively, both mounting clips 32 and attachment tabs could be combined when attaching the inflatable curtain 14 to the vehicle 12. The mounting clips 32 engage the top edge 24 of the inflatable curtain 14 and are in turn fastened to the vehicle 12 through the use of one or more fasteners 34. The fasteners 34 as shown in FIG. 1 are bolts, however, other types of fasteners 34 may be used, such as rivets, screws, nails, tethers, wire restraints, hooks and the like.

The inflatable curtain 14 can be disposed in a stowed configuration and a deployed configuration. When in a stowed configuration, the inflatable curtain 14 is rolled, folded, mechanically compacted, or otherwise gathered into a bundle, usually within a wrapper or sock. The inflatable curtain 14 in the stowed state is disposed proximate the roof rail 30 until inflated by the inflator 18, whereupon the curtain 14 extends downwards along the side door 28 during a collision or rollover situation. As shown in FIG. 1, the inflatable curtain 14 in the deployed configuration has a bottom edge 25 that extends below the side window sill 36 possibly as far as the belt line. The inflatable curtain 14 also should cover all or a substantial portion of the side window 38 to provide both impact protection and occupant retention for the vehicle passenger.

Referring still to FIG. 1, the inflatable curtain assembly 10 further includes a stiffening member 40. The stiffening member 40 could be a bar, rod, plate or similar structure that is disposed proximate the top edge 24 of the inflatable curtain 14 for preventing twisting, kinking or crimping of the inflatable curtain 14 during production, installation or service. More than one stiffening member 40 may also be used. The stiffening member 40 could be constructed of metal, plastic or other polymer, or any substance that has a greater stiffness than the inflatable curtain 14, which is usually constructed of a tightly woven textile material. The stiffening member 40 may be affixed to the inflatable curtain 14 by sewing, adhesives, welding, and the like. Furthermore, the stiffening member 40 could be disposed within a channel 42 proximate the top edge 24 of the inflatable curtain 14. The channel 42 could be integral with the parent material of the inflatable curtain 14 or it could be separately attached to the inflatable curtain 14 by sewing, bonding, welding, and the like.

In the inflatable curtain assembly 10 shown in FIG. 1, the stiffening member 40 is an elongated bar-shaped planar member. The stiffening member 40 is disposed within a channel 42 that is integral with the parent material of the inflatable curtain 14. The channel 42 could be formed in the inflatable curtain 14 at the time the curtain is woven using one-piece weaving technology. The channel 42 extends adjacent the top edge 24 and along the entire longitudinal length 43 of the inflatable curtain 14.

A channel 42 that extends the entire length 43 of the curtain 14 could contain an elongated stiffening member 40 that also extends the entire length 43 of the curtain 14. This is advantageous because the stiffening member 40 could prevent twisting of the curtain 14 along its entire body. Moreover, multiple smaller stiffening members 40 could be inserted into the channel 42 to perform a similar function. However, the channel 42 need not extend the entire longitudinal length 43 of the inflatable curtain 14. The channel 42 could just extend from one edge of the curtain 14 adjacent the gas guide 16 receiving inlet port 44 to proximate at least one mounting location where the curtain 14 is mounted on or proximate the roof rail 30 with a fastener 34.

As depicted in FIG. 1, the stiffening member 40 extends from the gas guide 16 to the closest mounting location 46. This prevents twisting of the curtain 14 at a critical area between the gas guide 16 junction and the closest mounting location 46 of the curtain 14 proximate the roof rail 30. The longitudinal length of the stiffening member 40 will vary among different vehicles and airbag systems because the distance between the gas guide 16 and the closest mounting location 46 is different from vehicle to vehicle and among different airbag assemblies. However, the stiffening member 40 could overlap several or all of the other mounting locations to prevent twisting of the curtain 14 along its longitudinal length 43.

The stiffening member 40 could have an attaching portion 48 disposed at a first end 50 for connecting to the gas guide 16. As illustrated in FIG. 1, the gas guide 16 could have a defined location 52 for receiving the attaching portion 48 of the stiffening member 40. The defined location 52 could be a protrusion, such as a hook, jut, nodule, bump or other projection that receives the attaching portion 48. The attaching portion 48 could be an orifice, hook or similar structure at the first end 50 of the stiffening member 40 for engaging the protrusion at the defined location 52 on the gas guide 16. By interconnecting the inflatable curtain 14 and the gas guide 16, the stiffening member 40 not only prevents twisting of the curtain 14, but also ensures that the curtain 14 and gas guide 16 are properly oriented and aligned.

Figure 2A:
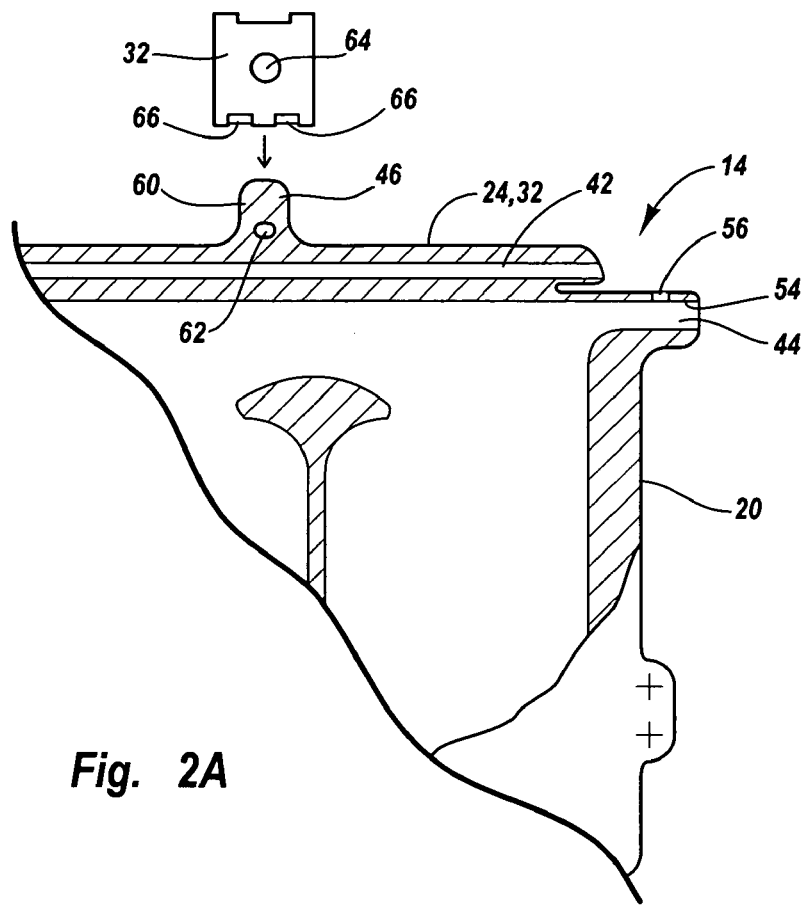
FIG. 2a is a cut-away, cross-sectional, side elevation view of the portion of the inflatable curtain that has an inlet port for receiving a gas guide.

Referring to FIG. 2a, the corner formed at the top 24 and rear 20 edges of the inflatable curtain 14 of the present invention is shown from a cut-away, cross-sectional, side elevation view. The channel 42 for receiving a stiffening member, such as the stiffening member 40 shown in FIG. 1, is formed integral with the parent material of the inflatable curtain 14, and extends just below, and substantially parallel with the top edge 24 of the inflatable curtain 14. The channel 42 could be located elsewhere on the curtain 14, as long as the stiffening member 40 that can be disposed therein is able to extend adjacent the inlet port 44 to connect to the gas guide 16. In the embodiment illustrated in FIG. 2a, the channel 42 is located just above the inlet port 44. On the outer edge 54 of the inlet port 44 there exists a receiving aperture 56 that can receive a protrusion on a gas guide 16 for facilitating proper orientation and connection of the inflatable curtain 14 and the gas guide 16.

The inflatable curtain 14 shown in FIG. 2a has one or more attachment tabs 60 located proximate the top edge 24. The attachment tabs 60 are extensions or flaps that extend from the top edge 24 and are designed to mount the inflatable curtain 14 on or proximate the roof rail 30 of the vehicle 12. The attachment tabs 60 could include an orifice 62 that is sized such that a fastener 34 may pass through the attachment tab 60 and secure the inflatable curtain 14 to the vehicle 12.

Additionally, mounting clips 32 may be used in conjunction with the attachment tabs 60, such that a mounting clip 32 receives the attachment tab 60 and can be mounted on or proximate the roof rail 30 of the vehicle 12. The mounting clip 32 could also have an orifice 64 that aligns with the orifice 62 of the attachment tab 60 for allowing a fastener 34 to pass through and secure the mounting clip 32 and the inflatable curtain 14 to the vehicle. The mounting clip 32 depicted in FIG. 2a has locking tabs 66, for locking the mounting clip 32 on opposing sides of the inflatable curtain 14. Mounting clips 32 can also be used without attachment tabs 60 in receiving the top edge 24 of the inflatable curtain 10. Those with skill in the art will recognize that other securing devices can be used instead of mounting clips 32 such as mounting brackets, braces, clamps, and the like.

Figure 2B:
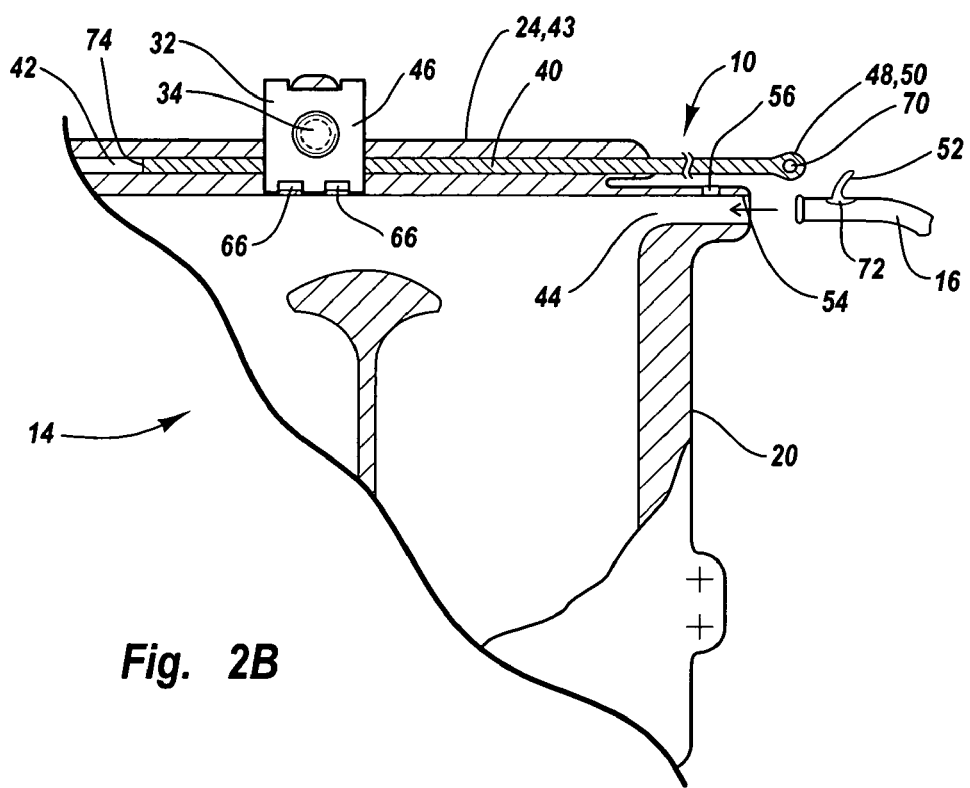
FIG. 2b is a cut-away, cross-sectional, side elevation view of the inflatable curtain assembly at the junction of the curtain inlet port, stiffening member, and gas guide.

Referring to FIG. 2b, the inflatable curtain assembly 10 is shown from a cut-away, cross-sectional, side elevation view at the junction of the inflatable curtain 14 inlet port 44, stiffening member 40, and gas guide 16. The stiffening member 40 is disposed within the channel 42 that is integral with the parent material of the inflatable curtain 14. Alternatively, the stiffening member 40 could be attached to the inflatable curtain 14 through sewing, bonding, welding, and the like. The stiffening member 40 could be a bar, rod, plate or similar structure that has a stiffness greater than the inflatable curtain 14 to prevent twisting, kinking or crimping of the curtain 14, particularly between the junction of the gas guide 16 and the inlet port 44 and the closest mounting location 46. Preferably the stiffening member 40 has a bar shape because the bar-shape structure is particularly effective at resisting twisting.

The stiffening member 40 has an attaching portion 48 disposed at a first end 50 for connecting to the gas guide 16, which in turn is connected to the inflator 18. The attaching portion 48, illustrated in FIG. 2b, is a ring 70, but could also be any other kind of female member, hook or similar structure for receiving a protrusion 72 on the gas guide 16. Alternatively, the attaching portion 48 could be a hook, nodule, or male member that engages an indentation or female portion on the gas guide 16.

The stiffening member 40 has a second end 74 that extends past the closest mounting location 46 where the inflatable curtain 14 is mounted on or near the roof rail 30 of the vehicle 12. The longitudinal length of the stiffening member 40, therefore, extends from the gas guide 16 to or past the closest mounting location 46. The mounting clip 32 can interface with the stiffening member 40 within the channel 42 to enhance the rigidity of the stiffening member 40 when installed, thereby increasing its ability to prevent twisting of the inflatable curtain 14. Furthermore, the stiffening member 40 could overlap several or all of the other mounting locations and also interface with several or all of the mounting clips 32 to prevent twisting of the curtain 14 along its longitudinal length 43.

Referring still to FIG. 2b, the gas guide 16 has a protrusion 72 such as a hook, nub, nodule, bump or other projection for engaging the ring 70 on the first end 50 of the stiffening member 40. Alternatively, the gas guide 16 could have an indentation or female portion for receiving a protrusion on the stiffening member 40. The stiffening member 40 then is securely engaged between the gas guide 16 and the closest mounting location 46 in such a manner as to prevent twisting, crimping and kinking of the inflatable curtain 14 between the two. The gas guide 16 also interfaces with the inlet port 44 of the inflatable curtain 14 in such a manner as to prevent the separation of the curtain 14 from the gas guide 16 when the inflator 30 is activated. The inflatable curtain 14 could have a receiving aperture 56 adjacent the inlet port 44 that engages with the protrusion 72 on the gas guide 16 to retain the connection and ensure proper orientation of the curtain 14 and the gas guide 16.

Figure 3:
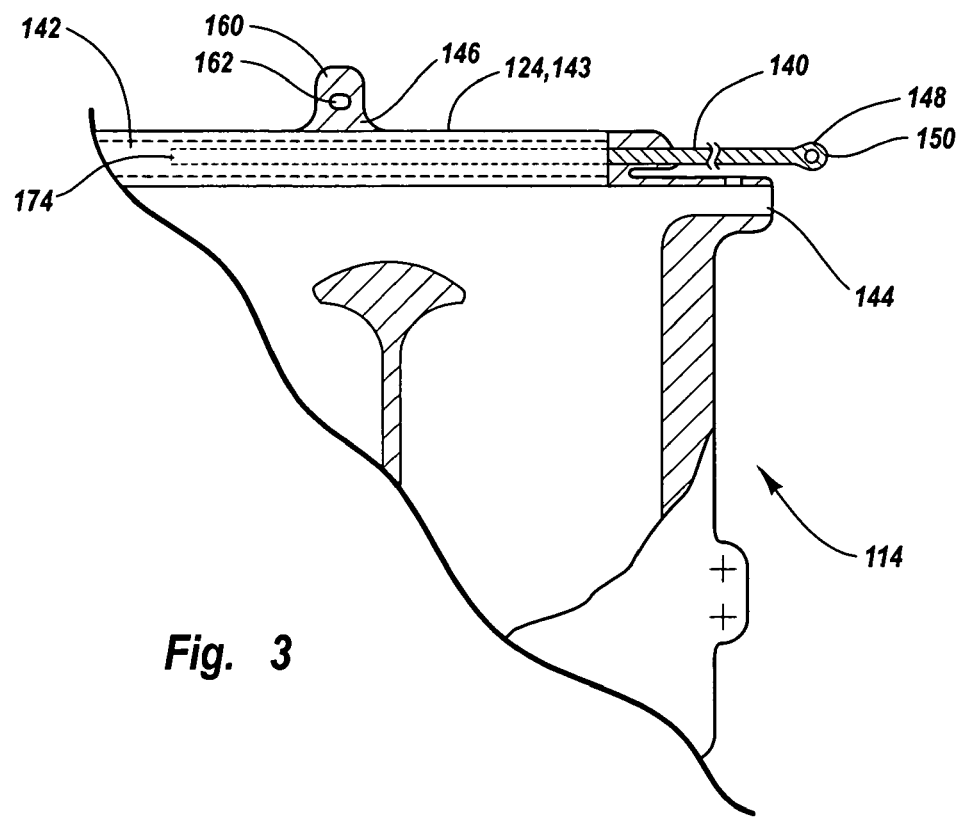
FIG. 3 is a cut-away, cross-sectional, side elevation view an alternative embodiment of the stiffening member disposed within a channel attached to the inflatable curtain.

Referring to FIG. 3, an alternative embodiment of the inflatable curtain 114 is shown in a cut-away, cross-sectional, side elevation view where the stiffening member 140 is disposed within a channel 142 affixed to the curtain 114. In the previous embodiment shown in FIG. 2b, the channel 42 was formed from the parent material of the inflatable curtain 14. Here the channel 142 is a separate component that is affixed proximate the top edge 124 of the curtain 114 along a longitudinal length 143, or a portion thereof. The channel 142 could be affixed to the inflatable curtain 114 by sewing, bonding, welding, stapling, and the like.

The channel 142 is attached to the curtain 114 in a manner that allows the stiffening member 140 to project out of the channel 142 adjacent the inlet port 144. The attaching portion 148 on the first end 150 of the stiffening member 140 is not disposed within the channel 142 so it can connect to the gas guide (not shown). Rather, the second end 174 of the stiffening member 140 is disposed within the channel 142. The channel 142 extends from adjacent the inlet port 144 to just past the closest mounting location 146. The closest mounting location 146 could be an attachment tab 160 that has an orifice 162 for receiving a fastener. The channel 142 could extend further adjacent more mounting locations if desired.

Figure 4A:
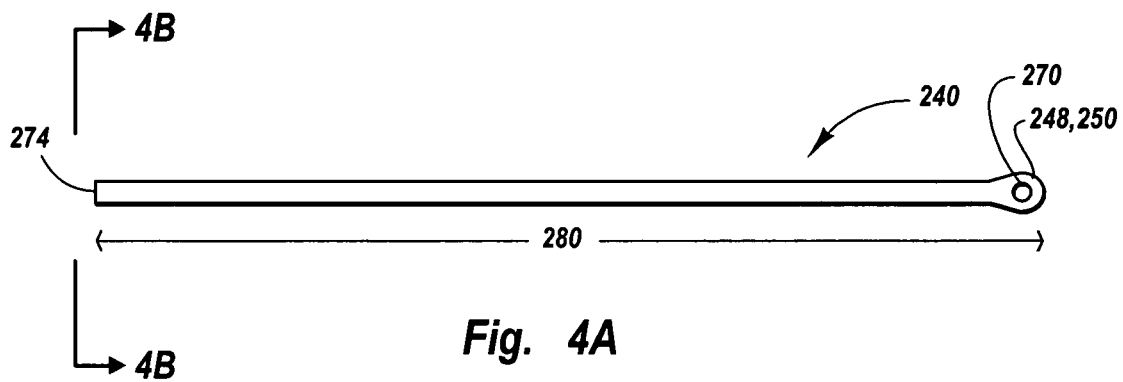
FIG. 4a is a plan view of one embodiment of the stiffening member.
Figure 4B:
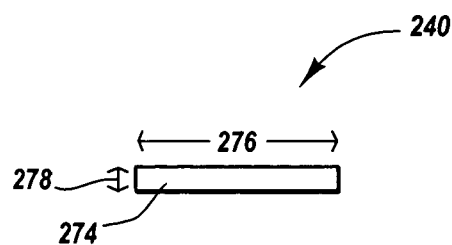
FIG. 4b is an end view of one embodiment of the stiffening member.

Referring to FIGS. 4a and 4b, one embodiment of the stiffening member 240 is depicted from an overhead plan view (FIG. 4a) and an end view (FIG. 4b) of the second end 274 of the stiffening member 240. The stiffening member 240 illustrated is a flat, elongated bar-shaped member. It could also be a plate, rod or similar structure that can resist twisting. The stiffening member 240 could be constructed of metal, plastic, or any substance that has a greater stiffness than the inflatable curtain (which is usually constructed of a tightly woven textile material).

The stiffening member 240 has an attaching portion 248 at the first end 250 for connecting to the gas guide. The attaching portion 248 illustrated in FIG. 4a is a ring-shaped structure 270 with an orifice. However, the attaching portion 248 could be any other kind of female member or hook for receiving a protrusion on the gas guide. Alternatively, the attaching portion 248 could be a nodule, hook, projection or similar male member for engaging an indentation or female portion of the gas guide.

The second end 274 of the stiffening member 240 shown in FIG. 4b illustrates its flattened bar-shape where its width 276 is greater than its height 278. The longitudinal length 280 of the stiffening member 240 is long enough to extend from the gas guide to the closest mounting location of the curtain to prevent twisting between those locations. The length 280 of the stiffening member 240 will vary among different vehicles and airbag systems because the distance between the gas guide and the closest mounting location is different from vehicle to vehicle and among different airbag assemblies. Furthermore, the stiffening member 240 could have a length 280 that overlaps several or all of the mounting locations in order to prevent twisting of the curtain along the curtain's longitudinal length.

Referring now to FIG. 1–4*b* generally, the present invention also provides for an efficient method of resisting twisting of an inflatable curtain during production, installation or service of the curtain or vehicle. First an inflatable curtain 14, 114 with an inlet port 44, 144 and mounting locations 46, 146 is obtained. A stiffening member 40, 140, 240 is positioned along the longitudinal length 43, 143 of the inflatable curtain 14, 114 adjacent the closest mounting location 46, 146. The stiffening member 40, 140, 240 is preferably placed within a channel 42, 142 in the inflatable curtain 14, 114 that extends from adjacent the inlet port 44, 144 to at least the closest mounting location 46, 146. The gas guide 16 that extends from the inflator 18 is connected to the inlet port 44, 144 of the inflatable curtain 14, 114. The stiffening member 40, 140, 240 is then attached to the gas guide 16. Mounting clips 32 can then be engaged with both the mounting locations 46, 146 on the inflatable curtain 14, 114 and the stiffening member 40, 140, 240 disposed within the channel 42, 142. This method prevents twisting of the inflatable curtain 14, 114 between the junction of the gas guide 16 and the inlet port 44, 144. It also can prevent twisting along the entire longitudinal length 43, 143 of the inflatable curtain 14, 114. It should be apparent that each of the above steps for twist prevention of an inflatable curtain 14, 114 could be performed in a different order and still achieve the desired result.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag assembly, comprising:
an inflatable curtain having a gas inlet for receiving a gas guide and at least one mounting location for mounting the inflatable curtain to a vehicle; and
a stiffening member having a stiffness greater than the inflatable curtain, the stiffening member extending adjacent the at least one mounting location and along a length of the inflatable curtain such that the stiffening member is connectable to the gas guide, wherein the stiffening member is a bar-shaped elongated flat member.

2. The airbag assembly of claim 1, further comprising a channel in the inflatable curtain disposed adjacent the inlet and the at least one mounting location, the stiffening member being located within the channel.

3. The airbag assembly of claim 2, wherein the channel is formed integral with a material of the inflatable curtain.

4. The airbag assembly of claim 2, wherein the channel is attached to the inflatable curtain.

5. The airbag assembly of claim 1, wherein the stiffening member is an elongated plastic component.

6. The airbag assembly of claim 1, wherein the stiffening member is an elongated metal component.

7. The airbag assembly of claim 1, wherein the at least one mounting location is at least one attachment tab located on an upper edge of the inflatable curtain.

8. The airbag assembly of claim 7, further comprising at least one mounting clip that receives the at least one attachment tab and the stiffening member adjacent the at least one attachment tab.

9. The airbag assembly of claim 1, wherein the stiffening member has an attaching portion that can connect to a defined location on the gas guide.

10. The airbag assembly of claim 9, wherein the gas guide extends from an inflator to the inlet of the inflatable curtain.

11. The airbag assembly of claim 10, wherein the defined location on the gas guide is a protrusion.

12. The airbag assembly of claim 11, wherein the attaching portion on the stiffening member is an orifice that engages the protrusion on the gas guide.

13. The airbag assembly of claim 10, wherein the stiffening member is rigidly connected to the gas guide to prevent twisting of the inflatable curtain between the gas guide and the at least one mounting location.

14. The airbag assembly of claim 1, wherein the stiffening member extends proximate the gas inlet.

15. An airbag assembly, comprising:
an inflatable curtain having an inlet for receiving a gas guide and at least one mounting locations for mounting the inflatable curtain proximate a roof rail of a vehicle, the inflatable curtain further comprising a channel disposed adjacent the inlet and the at least one mounting location; and
a stiffening member having a stiffness greater than the inflatable curtain, the stiffening member disposed within the channel and extending adjacent the at least one mounting location and along a length of the inflatable curtain to proximate the inlet, the stiffening member having an attaching portion connectable to a defined location on the gas guide, wherein the stiffening member is rigidly connected to the gas guide to prevent twisting of the inflatable curtain between the gas guide and the at least one mounting location, wherein the channel is formed integral with a material of the inflatable curtain wherein the stiffening member is a bar-shaped elongated flat member.

16. The airbag assembly of claim 15, wherein the at least one mounting locations are at least one attachment tabs located on an upper edge of the inflatable curtain.

17. The airbag assembly of claim 16, further comprising at least one mounting clips that receive the at least one attachment tabs and the stiffening member adjacent the at least one attachment tab.

18. The airbag assembly of claim 17, wherein the bar-shaped elongated flat member is plastic.

19. The airbag assembly of claim 17, wherein the bar-shaped elongated flat member is metal.

20. The airbag assembly of claim 17, wherein the gas guide extends from an inflator to the inlet of the inflatable curtain.

21. The airbag assembly of claim 20, wherein the defined location on the gas guide is a protrusion.

22. The airbag assembly of claim 21, wherein the attaching portion on the stiffening member is an orifice that engages the protrusion on the gas guide.

* * * * *

UNITED STATES PATENT AND TRADEMARK OFFICE
CERTIFICATE OF CORRECTION

PATENT NO. : 7,125,038 B2 Page 1 of 1
APPLICATION NO. : 10/694322
DATED : October 24, 2006
INVENTOR(S) : Kurt Gammill It is certified that error appears in the above-identified patent and that said Letters Patent is hereby corrected as shown below:

Column 10, lines 42-46, please delete "inflatable curtain wherein the stiffening member is a bar-shaped elongated flat member." and replace it with --inflatable curtain, wherein the stiffening member is a bar-shaped elongated planar member.--

Column 10, line 55, please delete "elongated flat member" and replace it with --elongated planar member--.

Column 10, line 57, please delete "elongated flat member" and replace it with --elongated planar member--.

Signed and Sealed this

Sixth Day of March, 2007

JON W. DUDAS
*Director of the United States Patent and Trademark Office*